United States Statutory Invention Registration [19]

[11] Reg. Number: H684

Arszman et al. [43] Published: Oct. 3, 1989

[54] VENTED IN-TUBE BURNING ROCKET

[75] Inventors: Jerrold H. Arszman; Albert R. Maykut, both of Huntsville; John M. Tate, Arab, all of Ala.

[73] Assignee: The United States of America as represented by the Secretary of the Army, Washington, D.C.

[21] Appl. No.: 256,796

[22] Filed: Oct. 11, 1988

[51] Int. Cl.[4] ..... F42B 15/10

[52] U.S. Cl. ..... 102/377; 102/374

*Primary Examiner*—Deborah L. Kyle
*Assistant Examiner*—Richard W. Wendtland
*Attorney, Agent, or Firm*—Freddie M. Bush; James T. Deaton; Robert L. Broad, Jr.

[57] ABSTRACT

A rocket for firing from a tube having open ends wherein a rocket motor spaced from a projectile is connected to the projectile by a frangible, ported collar, the front of the motor having a vent for allowing combustion products to flow into the tube between the motor and the projectile. The pressure of the combustion products between the motor and the projectile will break the collar to allow the projectile to exit from the tube at a high velocity.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VENTED IN-TUBE BURNING ROCKET

DEDICATORY CLAUSE

The invention described herein may be manufactured, used, and licensed by or for the Government for governmental purposes without the payment to me of any royalties thereon.

BACKGROUND OF THE INVENTION

1. Field of the Invention

This invention relates to in-tube burning rockets.

2. Prior Art

It is known that higher rocket velocities can be achieved when a rocket is launched from a tube having a closed breech. In this approach, the propellant is confined at high pressures and the pressure of the combustion products behind the projectile provides the force to accelerate the projectile.

The primary disadvantage of using a closed breech tube for rocket launching is that substantial recoil is produced. This large amount of recoil makes it impractical to use the conventional closed breech launch concept with shoulder launched weapons such as some antitank weapons.

The recoilless rifle is a very efficient means of accelerating a payload to high velocities in relatively short launch tube lengths because only the payload is accelerated, with the propellant combustion products being expelled rearwardly from the tube. The conventional in-tube burning rocket is essentially without recoil but is less efficient since both the payload and the rocket motor must be accelerated to the final velocity.

SUMMARY OF THE INVENTION

A rocket for firing from a tube wherein a rocket motor spaced from a projectile or payload is connected to the projectile by a frangible, ported collar, the front of the motor being provided with a vent for allowing combustion products from the motor to flow into the space between the motor and the projectile. The pressure of the combustion products between the motor and the projectile causes the collar to break to allow the projectile to exit from the tube at a high velocity.

DESCRIPTION OF THE PREFERRED EMBODIMENT

Figure 1:
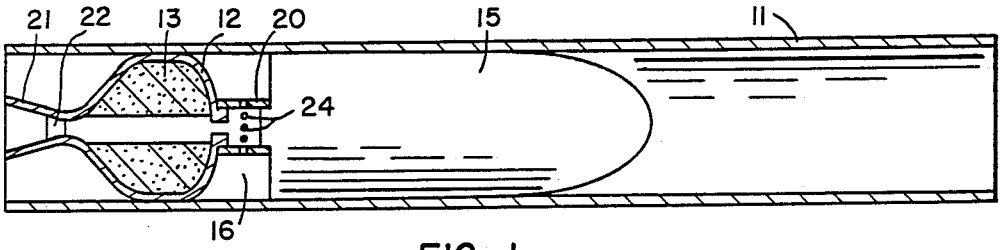
FIG. 1 is a schematic cross-sectional view showing the rocket of the present invention in a launching tube.

Referring now in detail to the drawing, there is shown an open-ended tube 11 from which the rocket of this invention is to be launched. The rocket consists of a rocket motor 12 of a known type, which contains a solid propellant 13, and a payload or projectile 15. The projectile 15 is spaced from the rocket motor 12 to provide a space 16 in the tube 11 between the motor 12 and the projectile 15. The motor 12 and the projectile 15 are connected by a frangible collar 20 Which is provided with a plurality of spaced ports 21 (FIG. 1).

The rocket motor 12 is provided with a conventional nozzle 21 extending from the rear of the motor and containing a plug 22 (FIG. 1). The purpose of the plug 22 is to allow pressure to increase to a certain point inside the motor 12 after the propellant 13 is ignited. When the pressure in the motor 12 has reached a predetermined value, the plug 22 will be blown out of the nozzle 21 and the motor 12 will begin to move alone the tube 11. This increases the velocity of the rocket motor 12.

The front of the motor 12 is provided with a vent opening 23 through which the products of combustion of the propellant 13 can pass into the collar 20 and through the ports 21 into the space 16 between the motor 12 and the projectile 15.

The collar 20 is made up of a material which is adapted to break to separate the motor 12 from the projectile 15 when the pressure of the combustion products between the motor and the projectile reaches a predetermined level. One skilled in the art will be familiar with materials from which the collar 20 can be made.

Figure 2:
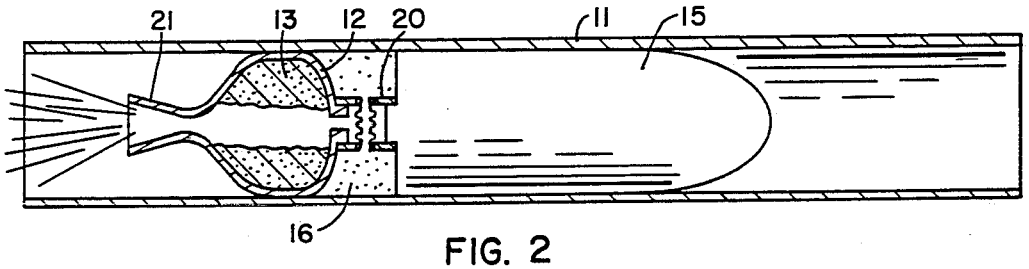
FIG. 2 is a schematic cross-sectional view showing the positioning of the rocket motor and projectile immediately after the breaking of the frangible collar interconnecting the motor and the projectile.
Figure 3:
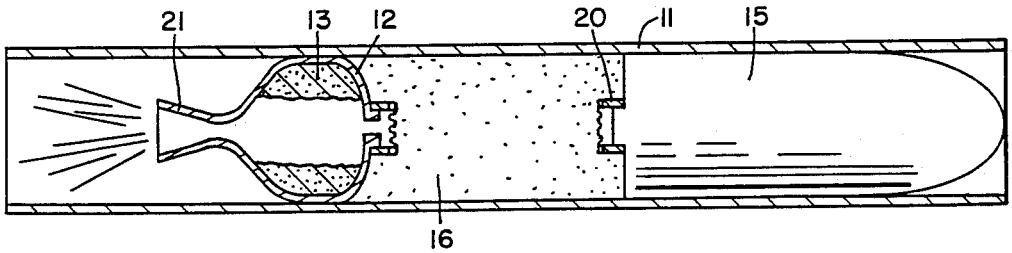
FIG. 3 is a schematic cross-sectional view showing the positioning of the motor and the projectile at an intermediate stage of the launch.
Figure 4:
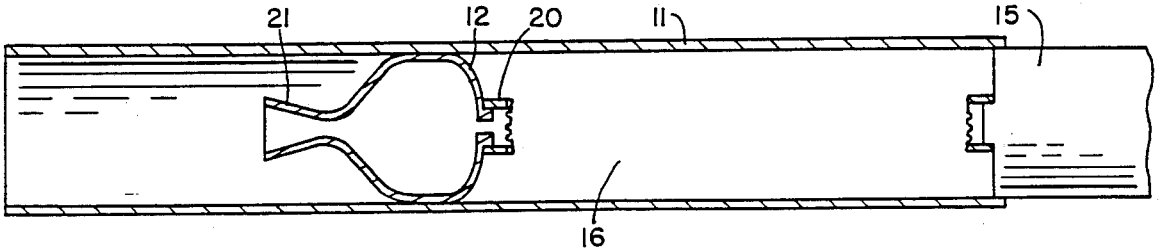
FIG. 4 is a schematic cross-sectional view showing the positioning of the motor and the projectile as the projectile exits from the launch tube.

FIG. 2 shows the positioning of the motor 12 and the projectile 15 immediately after the collar 20 breaks. The projectile 15 will be accelerated by virtue of the high pressure of the combustion products in the space 16. FIG. 3 shows the projectile after it has accelerated away from the motor 12 and FIG. 4 shows the positioning of the motor 12 and the projectile 15 as the projectile exits from the tube 11. At this point, all of the propellant has burned from the motor 12.

In operation, the rocket is placed in the tube 11 and the solid propellant is ignited in a known manner. When the pressure of the combustion products formed from the boring propellant 13 reaches a predetermined level, the pressure inside the motor 12 will blow out the plug 22 and combustion products exiting from the motor 12 through the nozzle 21 will cause the motor and the projectile to begin to move alone the tube 11. During this time, combustion products will pass through the vent opening 23 and the ports 21 into the space 16 between the motor 12 and the projectile 15.

When the pressure between the motor and the projectile reaches a predetermined vale, the collar 20 will break and allow the projectile to begin to accelerate away from the motor, which begins at this time to decelerate. This continues until the motor 12 reaches full thrust and once again begins to accelerate. At some point in the launch the propellant 13 is expended, with the projectile continuing to accelerate and the motor to decelerate because of the pressure of the combustion products between the motor and the projectile. The motor 12 continues to decelerate until the projectile exits from the tube 11, at which time the motor retains its velocity until it exits from the tube 11 either fore or aft, depending on its final velocity.

In effect, the motor 12 traveling behind the projectile 15 creates a closed breech launch by maintaining a relatively high pressure behind the projectile to accelerate the projectile, i.e., the motor behind the projectile simulates a closed breech without the recoil encountered with a closed breech launch.

In this approach the recoil advantages of a tube launched rocket are combined with the recoilless rifle advantage of accelerating only the payload. This combination provides a highly efficient means for imparting velocity to a projectile without the problem of recoil control.

What is claimed is:

1. A rocket for firing from a tube having open ends, comprising (a) a motor containing a propellant and having in a rear end thereof a nozzle for discharge of combustion products formed when the propellant is burned, said motor having a front end containing a vent for venting a portion of said combustion products into the tube in front of the motor, (b) a projectile positioned in front of and spaced from the motor, and (c) a frangible collar secured to and positioned between the motor and the projectile, said collar surrounding said vent and being provided with a port for allowing vented combustion products to flow into the tube between the motor and the projectile.

2. The rocket of claim 1 wherein the collar breaks to separate the motor and the projectile when a predetermined pressure is reached in the space between the motor and the projectile.

3. The rocket of claim 2 wherein the collar is provided with a plurality of ports.

* * * * *